United States Patent
Ashdown et al.

(10) Patent No.: US 6,850,482 B1
(45) Date of Patent: *Feb. 1, 2005

(54) SYSTEM AND METHOD FOR DATA TRAFFIC REDIRECTION

(75) Inventors: Mike Ashdown, Frisco, TX (US); Hu Shen, Plano, TX (US); Steve Lynchard, San Antonio, TX (US)

(73) Assignee: Sevis Systems, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/536,958

(22) Filed: Mar. 28, 2000

(51) Int. Cl.[7] .......................... H04L 12/66; H04Q 11/00; H04M 7/00
(52) U.S. Cl. ...................... 370/217; 370/237; 370/352; 370/401; 370/467; 379/88.17; 379/93.07; 379/213; 379/220.01; 379/221.08
(58) Field of Search ................................ 370/217, 218, 370/235, 237, 352, 353, 354, 356, 389, 401, 410, 465, 466, 467, 522, 524; 379/88.17, 93.07, 213, 219, 220.01, 221.08, 93.01, 207, 210, 220, 221, 229; 709/238, 239, 249, 250

(56) References Cited

U.S. PATENT DOCUMENTS

| | | | |
|---|---|---|---|
| 5,319,638 A | 6/1994 | Lin ............................. | 370/60 |
| 5,377,327 A | 12/1994 | Jain et al. .................... | 395/200 |

(List continued on next page.)

FOREIGN PATENT DOCUMENTS

EP        0792074 A2  *  8/1997  ........... H04Q/3/00

OTHER PUBLICATIONS

Dr. Amir Atai, et al., "Architectural Solutions to Internet Congestion Based on SS7 and Intelligent Network Capabilities", 18 pgs., 1997, Bellcore.

(List continued on next page.)

*Primary Examiner*—Alpus H. Hsu
(74) *Attorney, Agent, or Firm*—Haynes and Boone, LLP

(57) ABSTRACT

A system and method for intelligently redirecting data traffic from a Public Switched Telephone Network (PSTN) to a data network. The system can include: an intelligent communications platform connected between a switch and a Signaling System 7 (SS7) network to intercept SS7 messages between the switch and the SS7 network; and a communications control module connected to the intelligent communications platform via a Transmission Control Protocol/Internet Protocol (TCP/IP) link, the communications control module for providing management and communications to the ICP and providing access to the management and communication for a plurality of subscribers. The ICP can include an SS7 I/O card for processing SS7 messages and a CPU card for processing ISUP and TCAP. The communications control module can include: instructions for receiving messages from other ICPs for updated information on congestion on certain routes. The communications control module can also include instructions for receiving messages from other ICPs for updated information on congestion on certain routes. The communications control module can include: instructions for the plurality of subscribers to enter respective access line availability, alternative access numbers; and instructions for a plurality of users to populate respective user profiles. The GUI can allow internet service providers (ISP) to update information on status of a plurality of modem banks within the ISP, and can allow a network engineer to view traffic congestion and redirect traffic if necessary.

20 Claims, 3 Drawing Sheets

U.S. PATENT DOCUMENTS

| | | | | |
|---|---|---|---|---|
| 5,691,985 | A | | 11/1997 | Lorenz et al. ............... 370/401 |
| 5,701,301 | A | | 12/1997 | Weisser, Jr. ................. 370/428 |
| 5,712,903 | A | * | 1/1998 | Bartholomew et al. ....... 379/89 |
| 5,774,668 | A | | 6/1998 | Choquier et al. ...... 395/200.53 |
| 5,802,285 | A | | 9/1998 | Hirviniemi ............... 395/200.8 |
| 5,881,145 | A | * | 3/1999 | Giuhat et al. .......... 379/221.13 |
| 5,905,724 | A | * | 5/1999 | Carson et al. ............... 370/385 |
| 5,933,490 | A | | 8/1999 | White et al. ................. 379/221 |
| 5,949,871 | A | * | 9/1999 | Kabay et al. ................ 379/229 |
| 5,951,694 | A | | 9/1999 | Choquier et al. ............. 714/15 |
| 5,983,281 | A | | 11/1999 | Ogle et al. ................... 709/249 |
| 5,983,282 | A | | 11/1999 | Yucebay ..................... 709/249 |
| 6,282,267 | B1 | * | 8/2001 | Nolting ........................ 379/34 |
| 6,327,358 | B1 | * | 12/2001 | March et al. .......... 379/221.01 |
| 6,442,169 | B1 | * | 8/2002 | Lewis ........................ 370/401 |
| 6,480,597 | B1 | * | 11/2002 | Kult et al. ................... 379/242 |
| 6,493,353 | B2 | * | 12/2002 | Kelly et al. ................. 370/467 |
| 6,668,051 | B1 | * | 12/2003 | Ashdown et al. ...... 379/221.08 |

OTHER PUBLICATIONS

Ascend Communications, Inc., "Internet Call Diversion, Solving the Internet Congestion Problem and Leading the Delivery of Intelligent Network Solutions for the Next–Generation Network", 6 pgs., 1999, Ascend Communications, Inc.

Dr. James Gordon, et al., "Economics of Internet Offload and Voice/Data Integration", Dec. 1998, 17 pgs., Issue 1, Telcordia Technologies.

* cited by examiner

SYSTEM AND METHOD FOR DATA TRAFFIC REDIRECTION

RELATED PATENT APPLICATIONS

This application relates to the following co-pending United States Patents, incorporates them by reference in their entirety and is assigned to the assignee of the present invention:

| U.S. Pat. No. | Filing Date: | Inventors: | Title: |
| --- | --- | --- | --- |
| 6,668,051 | Mar. 28, 2000 | Ashdown et al. | Intelligent Communications Point Platform; |
| 6,625,273 | Mar. 28, 2000 | Ashdown et al. | System and Method for a Local Number Portability Cache; |
| 6,308,276 | Sept. 7, 1999 | Ashdown et al. | SS7 Firewall System. |

BACKGROUND

The invention relates generally to telecommunications networks and, more particularly, to a system and method for redirecting data traffic from a Signaling System 7 (SS7) network to a data network.

The SS7 network is the backbone of the world's telecommunications networks. Service providers across the globe rely on the SS7 network to implement setup, routing, and control of a call, as well as to provide to residential, business, and government customers advanced services such as 800 and 900 calling, caller ID, local number portability, and calling card verification. Without the SS7 network, the world's telecommunications networks would cease to function properly.

The SS7 network is comprised of a number of different types of signaling nodes, including Service Switching Points ("SSPs" and generally referred to as the "switch"), Signaling Transfer Points ("STPs"), and Service Control Points ("SCPs"). SSPs originate, manage, and terminate calls. SCPs act as centralized databases that validate, authorize, and answer service requests from SSPs, such as how to route an 800 number call. STPs route SS7 messages between SSPS, SCPs, and other STPs. The SS7 network was designed for an average voice call of about three to five minutes.

However, the booming growth of the Internet and remote access to data services from businesses, homes and schools has resulted in an unprecedented increase in data traffic and a strain on the SS7 network and the Public Switched Telephone Network (PSTN) in general. The average Internet call has been recently estimated to be about 20 minutes or more. To make matters worse, users often leave their lines open for hours, completely tying up all circuits and trunks between the user and the Internet Service Provider (ISP). These long hold time Internet calls increase the number of callers not getting a dial tone or receiving a quick busy signal, causing capacity management problems for telecommunication service providers.

Diverting Internet traffic away from the PSTN has been attempted by a few vendors using a suite of products. The solutions usually fall into two categories. One category is to intercept calls from the caller before the calls get to the ingress switch. However, the solutions that implement this method have some problems. First of all, the switch may not be aware that the call has been intercepted and the caller is busy, and thus can not provide class services properly (call forwarding, voice mail indicating, automatic callback . . . ).

The other category is a post-switch solution. This type of solution utilizes the ingress switch, but redirects the data traffic before it gets to the egress switch. Usually, the sooner it redirects the traffic, means more efficient use of the PSTN.

Therefore, what is needed is an efficient, transparent, and cost effective method to redirect data traffic away from the PSTN in order not to tie up unnecessary voice circuits and/or switches.

SUMMARY OF THE INVENTION

The present invention, accordingly, provides a system and method for _redirecting Internet calls in the post switch configuration utilizing an intelligent communications platform (ICP). The ICP seamlessly intercepts SS7 messages directed to the SS7 network from an ingress switch and determines which messages indicate data traffic, and accordingly redirects data traffic to a data network.

The present invention includes a data traffic offload software application residing on the ICP and on an intelligent communications manager (ICM). The data traffic offload software application intercepts transaction capability application part (TCAP) queries and provides a response on behalf of the addressed service control point (SCP). By responding to requests, the offload software application can re-route calls to separate trunk groups specifically provisioned for data calls. The offload software application also intercepts any ISUP messages and is therefore aware of all ingress calls to a data services provider subtended at the SSP. The offload software application is also capable of denying all calls to the data services provider at the ingress or egress switches.

The ICM includes two software applications, a communications controller and a graphical user interface (GUI). The communications controller provides a centralized point for command and control while the GUI allows users to interface with the controller from multiple locations.

A system and method for intelligently redirecting data traffic from a Public Switched Telephone Network (PSTN) to a data network is described. The system can include: an intelligent communications platform connected between a switch and a Signaling System 7 (SS7) network to intercept SS7 messages between the switch and the SS7 network; and a communications control module connected to the intelligent communications platform via a Transmission Control Protocol/internet Protocol (TCP/IP) link, the communications control module for providing management and communications to the ICP and providing access to the management and communication for a plurality of subscribers. The ICP can include an SS7 I/O card for processing SS7 messages and a CPU card for processing ISUP and TCAP. The communications control module can include: instructions for receiving messages from other ICPs for updated information on congestion on certain routes. The communications control module can also include instructions for receiving messages from other ICPs for updated information on congestion on certain routes. The communications control module can include: instructions for the plurality of subscribers to enter respective access line availability, alternative access numbers; and instructions for a plurality of users to populate respective user profiles. The GUI can allow internet service providers (ISP) to update information on status of a plurality of modem banks within the ISP, and can allow a network engineer to view traffic congestion and redirect traffic if necessary.

These and other objectives and features of the invention encompass a comprehensive system for redirecting data traffic from a voice network to a data network. Therefore, in accordance with the previous summary, objects, features and advantages of the present invention will become apparent to one skilled in the art from the subsequent description and the appended claims taken in conjunction with the accompanying drawings.

DETAILED DESCRIPTION

Figure 1:
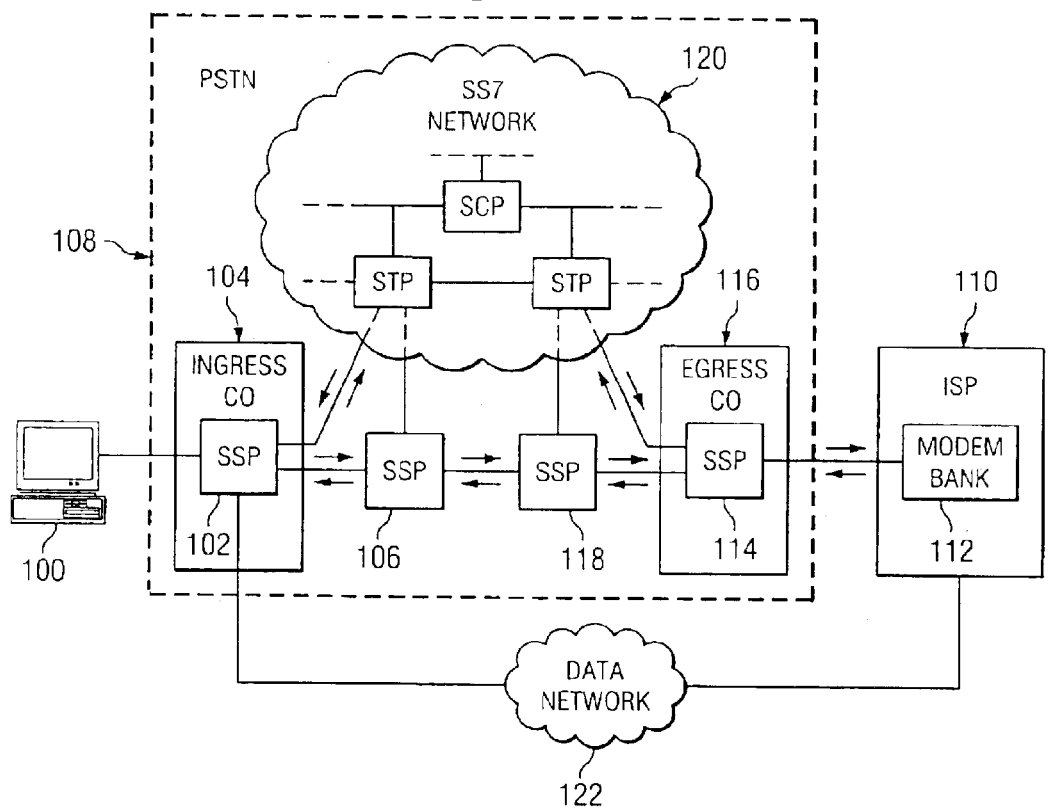
FIG. 1 is a schematic block diagram of a normal dial-up Internet session utilizing the PSTN and the SS7 network.

In FIG. 1, a reference numeral 100 designates a user at a computer connected to a switch 102 at an ingress central office (CO) 104. Depicted in the rest of FIG. 1, is another switch 106 in the Public Switched Telephone Network (PSTN) 108 connected to the ingress switch 102. The Internet Service Provider (ISP) 110 has a modem bank 112 connected to the switch 114 at the egress CO 116. The egress switch 114 is in turn connected to another switch 118 within the PSTN 108. FIG. 1 does not show any other switches between switch 106 and switch 118, but in actuality, the preferred embodiment could have many more switches between the ingress switch 102 and the egress switch 114 or none at all. In addition, all switches 102, 106, 118, and 114 shown in FIG. 1 are connected to the Signaling System 7 (SS7) worldwide network 120. Within the SS7 network 120 are numerous Signaling Transfer Points (STPs) and Signaling Control Points (SCPs). Moreover, the ingress switch 102 and the ISP 110 are connected to the data network 122. Although, the ISP 110 is shown to be directly connected to the data network, in actuality, the ISP 110 can also be connected to the data network 122 through the egress switch 114.

In the example shown in FIG. 1, a user would establish a dial-up Internet session by connecting the computer 100 through the ingress switch 102. The ingress switch 102 would then use TCAP/ISUP to establish a connection to the routed switch(s) within the PSTN in order to establish a voice circuit though the PSTN to the egress switch 114 to connect to the ISP's 110 modem bank 112. As the call gets established, voice circuits from the ingress switch 104 to the egress switch 114 get committed along with the switch resources along the way. In the meantime, if the modem bank 112 does not have any lines open, the caller gets a busy signal and then disconnects and tries again. The caller usually calls the ISP several more times before a call is connected to the ISP modem bank 112 or the caller gives up. Each attempt, ties up voice circuits and switch resources. In addition, when the caller does connect to the ISP modem bank 112, the average Internet session is almost always more than the average voice call which is three to five minutes, and what the PSTN is provisioned for.

Figure 2:
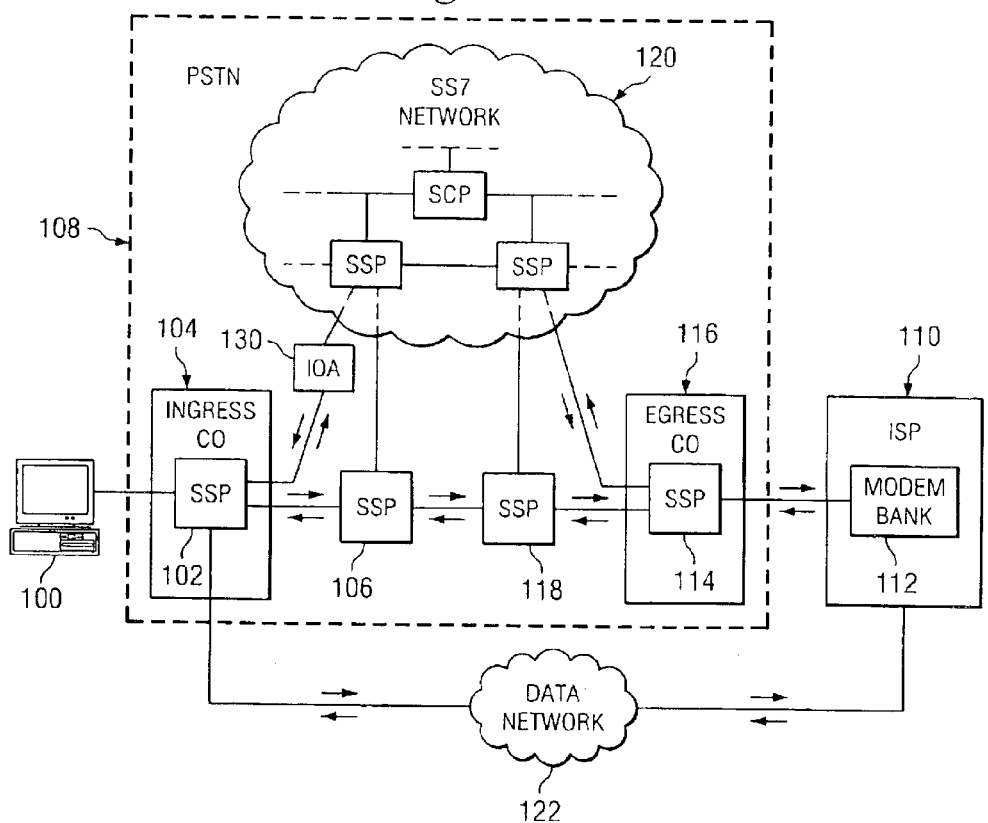
FIG. 2 is a schematic block diagram of a dial-up Internet session utilizing the preferred embodiment.

In FIG. 2, the same elements are depicted as FIG. 1, except that an Internet Offload Application (IOA) is shown as element 130. The IOA 130 intercepts the TCAP/ISUP signaling from the ingress switch 102 to the SS7 network. Once the IOA 130 recognized that the called party is a data session, the IOA routes the call directly through the data network 122 to the called ISP 110. The rerouting saves the PSTN valuable resources that were designed for voice calls by not tying up any switch resources or voice circuits beyond the ingress switch 102.

Figure 3:
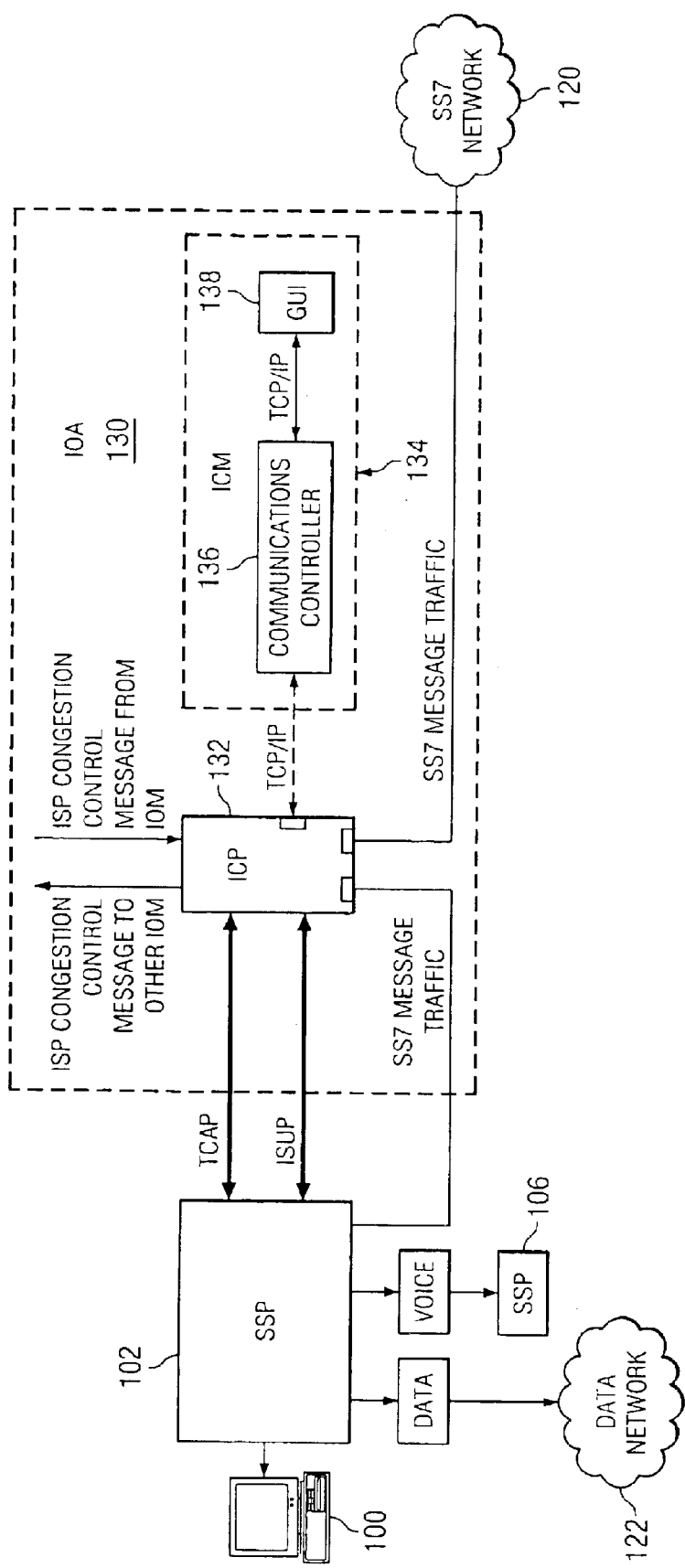
FIG. 3 is a more detailed functional block diagram of the system of FIG. 2.

FIG. 3 shows more details on how the IOA 130 actually works. First of all, the IOA 130 includes an Intelligent Communications Platform (ICP) 132 and Intelligent Communications Manager (ICM) 134. The ICM 134 includes the Communications Controller (CC) 136 and a Graphical User Interface (GUI) 138. The CC 136 provides a centralized point for command control while the GUI 138 allows users to interface with the controller from multiple locations. The ICP 132 recognizes a call to an ISP and then communicates with the ingress switch 102 using the TCAP messaging protocol. The ICP 132 can recognize the call to an ISP by using Automatic Number Identification (ANI) triggers such as Local Number Portability (LNP) or Special Access Codes (SAC) translation. Accordingly, when the user dials an ISP, the ingress switch 102 launches a TCAP query asking how to direct the phone call. Since the IOA contains both an ISP service profile and an ISP subscriber profile, the IOA can determine the best route to any of the multiple ISP locations and block calls when all accesses to an ISP are busy. In addition, calls in progress can be disconnected by the IOA with the use of the ISUP messaging protocol. Then, when the user calls back, the call will be redirected over a different (probably less busy or less costly) route. This will then allow network engineers to offload Internet traffic onto trunk groups provisioned specifically for data calls in a flexible way. Moreover, time of day based routing is also provided by the system.

The IOA also dynamically assigns trunk groups to meet peak hour demands along with "least cost" routing. To perform this, the ICM communicates with all ICPs within a network and dynamically configures each IOA based on time, trunk utilization, and other customer configurable parameters. The interface between the end users (ISPs and carriers) ad the communications controller software is implemented in TCP/IP. The communications controller system is configured to meet high availability requirements (99.999% uptime), high traffic demands, and can be easily maintained. The GUI is preferably written in a software language that can support multiple platforms, including Sun Microsystems Solaris, Microsoft Windows NT and Linux. In addition, the ICM provides "on the fly" configuration, visibility into network traffic, supports multiple GUI users, and can even meet high availability, and central office up-time requirements.

Figure 4:
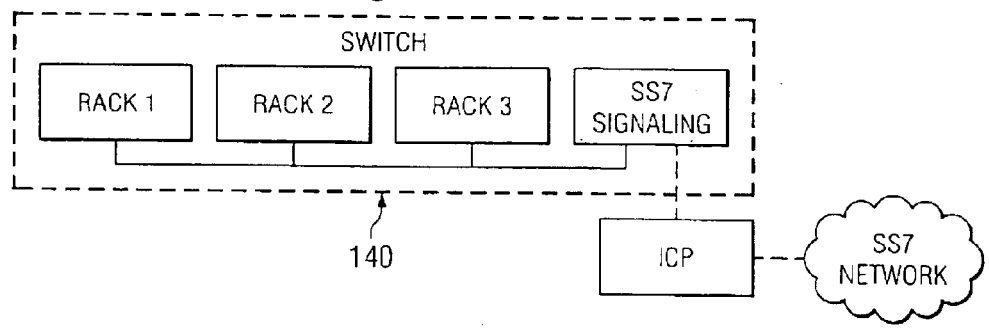
FIG. 4 is a detailed implementation of the preferred embodiment focusing on a telecommunications switch.

FIG. 4 illustrates an example implementation of the ICP connected to an example switch 140. Switch 140 contains 3 racks of circuits and associated equipment along with an SS7 module that executes all of the signaling to the SS7 network. In this embodiment, the ICP would be connected to the SS7 signaling module and the SS7 network in order to intercept all SS7 messages from the switch 140 and then relay them to the SS7 network. However, although the ICP and SS7 signaling module are shown to be two distinct and separate systems, they could be both combined by the switch manufacturer or a systems integrator and still achieve the goals of the invention.

It is understood that the present invention can take many forms and embodiments. The embodiments shown herein are intended to illustrate rather than to limit the invention, it being appreciated that variations may be made without departing from the spirit of the scope of the invention. The algorithms and process functions performed by the system may be organized into any number of different modules or computer programs for operation on one or more processors or workstations within the system. Different configurations of computers and processors for the system are contemplated. The system and method may be implemented completely separate from the switch or totally integrated into a switch and still accomplish the goals of the invention. In addition, the programs used to implement the methods and processes of the system may be implemented in any appropriate programming language and run in cooperation with any hardware device. The system may be used for netword service providers, Internet Service Providers, enterprises, and many other entities utilizing SS7 signaling devices.

Accordingly, although illustrative embodiments of the invention have been shown and described, a wide range of modification, change and substitution is intended in the foregoing disclosure and in some instances some features of the present invention may be employed without a corresponding use of the other features. Therefore, it is appropriate that the appended claims be construed broadly and in a manner consistent with the scope of the invention.

What is claimed is:

1. Apparatus for intelligently redirecting data traffic from a Public Switched Telephone Network (PSTN) to a data network, the apparatus comprising:

an Intelligent Communications Platform (ICP) connected between a switch and a Signaling System 7 (SS7) network to intercept SS7 messages between the switch and the SS7 network and to instruct the switch to redirect data traffic to the data network in response to one or more of the intercepted SS7 messages; and a communications control module connected to the intelligent communications platform via a Transmission Control Protocol/Internet Protocol (TCP/IP) link, the communications control module for providing management and communications to the ICP and providing access to the management and communication for a plurality of subscribers.

2. The apparatus of claim 1 wherein the ICP includes:

an SS7 I/O card for processing SS7 messages; and a CPU card for processing ISUP and TCAP.

3. The apparatus of claim 1 wherein the communications control module includes:

instructions for receiving messages from other ICPs for updated information on congestion on certain routes.

4. The apparatus of claim 1 wherein the switch is located at a central office.

5. The apparatus of claim 1 wherein the communications control module includes:

instructions for the plurality of subscribers to enter respective access line availability, alternative access numbers; and instructions for a plurality of users to populate respective user profiles.

6. The apparatus of claim 1 wherein a GUI allows internet service providers (ISP) to update information on status of a plurality of modem banks within the ISP.

7. The apparatus of claim 1 wherein a GUI allows a network engineer to view traffic congestion and redirect traffic if necessary.

8. A system for intelligently redirecting data traffic from a Public Switched Telephone Network (PSTN) to a data network, the system comprising a recordable medium, the recordable medium further comprising:

instructions for an Intelligent Communications Platform (ICP) connected between a switch and a Signaling System 7 (SS7) network to intercept SS7 messages between the switch and the SS7 network and to instruct the switch to redirect data traffic to the data network in response to one or more of the intercepted SS7 messages; and instructions for a communications control module connected to the intelligent communications platform via a Transmission Control Protocol/Internet Protocol (TCP/IP) link to provide management and communications to the ICP and to provide access to the management and communication for a plurality of subscribers.

9. The system of claim 8 wherein the recordable medium further comprises:

instructions for an SS7 I/O card to process SS7 messages; and instructions for a CPU card to process ISUP and TCAP.

10. The system of claim 8 wherein the recordable medium further comprises instructions for receiving messages from other ICPs for updated information on congestion on certain routes.

11. The system of claim 8 wherein the recordable medium further comprises:

instructions for the plurality of subscribers to enter respective access line availability, alternative access numbers; and instructions for a plurality of users to populate respective user profiles.

12. The system of claim 8 wherein the recordable medium further comprises instructions for a GUI to allow internet service providers (ISP) to update information on status of a plurality of modem banks within the ISP.

13. The system of claim 8 wherein the recordable medium further comprises instructions for a GUI to allow a network engineer to view traffic congestion and redirect traffic if necessary.

14. A method for intelligently redirecting data traffic from a Public Switched Telephone Network (PSTN) to a data network, the method comprising:

intercepting Signaling System 7 (SS7) messages by an Intelligent Communications Platform (ICP) connected between a switch and a Signaling System 7 (SS7) network, wherein the SS7 messages are from the switch and to the SS7 network;

instructing the switch to redirect data traffic from the PSTN to the data network in response to one or more of the intercepted SS7 messages;

providing management and communications control from a communications control module connected to the intelligent communications platform via a Transmission Control Protocol/Internet Protocol (TCP/IP) link; and providing access to the comunications control module to a plurality of subscribers.

15. The method of claim 14 further including:

processing SS7 messages with an SS7 I/O card; and processing ISUP and TCAP messages with a CPU card.

16. The method of claim 14 further including receiving messages from other ICPs for updated information on congestion on certain routes.

17. The method of claim 14 wherein the instructing to redirect the data traffic includes redirecting the data traffic to the data network without the data traffic going through the ICP.

18. The method of claim 14 further including:

providing the ability for the plurality of subscribers to enter respective access line availability, alternative access numbers; and providing the ability for a plurality of users to populate respective user profiles.

19. The method of claim 14 further including providing the ability for a GUI to allow internet service providers (OSP) to update information on status of a plurality of modem banks within the ISP.

20. The method of claim 14 further including providing the ability for a GUI to allow a network engineer to view traffic congestion and redirect traffic if necessary.

* * * * *